R. E. HELLMUND & R. E. FERRIS.
DYNAMO ELECTRIC MACHINE.
APPLICATION FILED FEB. 3, 1916.
1,301,844.
Patented Apr. 29, 1919.
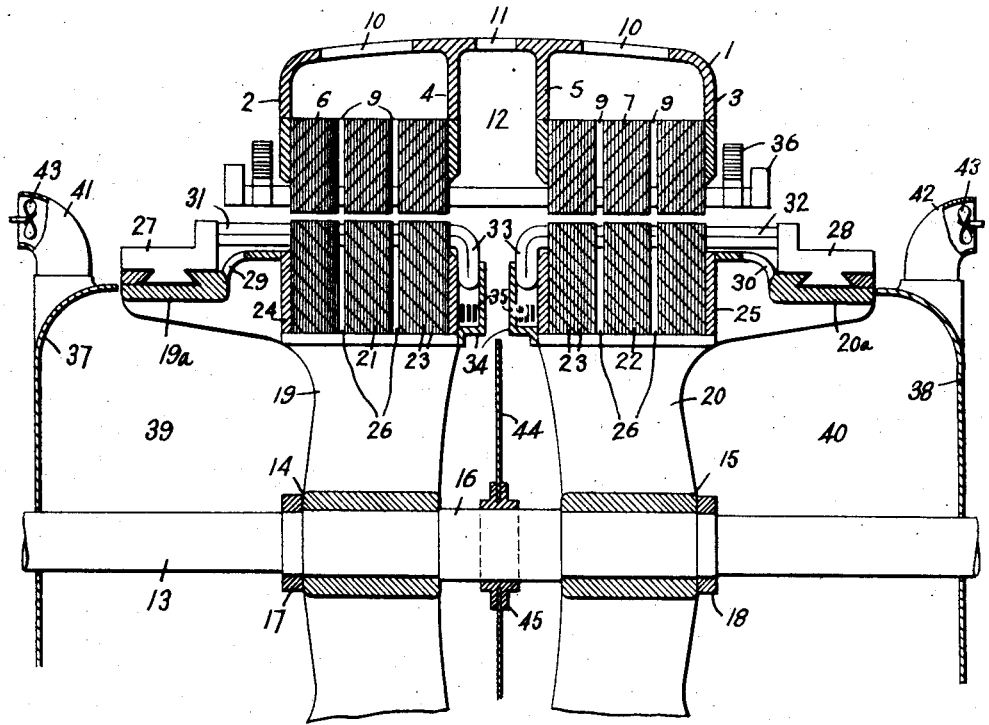
WITNESSES:
Fred. H. Miller
INVENTOR
Rudolf E. Hellmund &
Ralph E. Ferris
BY
ATTORNEY

UNITED STATES PATENT OFFICE.

RUDOLF E. HELLMUND, OF PITTSBURGH, AND RALPH E. FERRIS, OF SWISSVALE, PENNSYLVANIA, ASSIGNORS TO WESTINGHOUSE ELECTRIC AND MANUFACTURING COMPANY, A CORPORATION OF PENNSYLVANIA.

DYNAMO-ELECTRIC MACHINE.

1,301,844.   Specification of Letters Patent.   Patented Apr. 29, 1919.

Application filed February 3, 1916. Serial No. 75,932.

*To all whom it may concern:*

Be it known that we, RUDOLF E. HELLMUND, a subject of the Emperor of Germany, and a resident of Pittsburgh, in the county of Allegheny and State of Pennsylvania, and RALPH E. FERRIS, a citizen of the United States, and a resident of Swissvale, in the county of Allegheny and State of Pennsylvania, have invented a new and useful Improvement in Dynamo-Electric Machines, of which the following is a specification.

Our invention relates to dynamo-electric machines and particularly to the ventilation of heavy-duty motors severally comprising a plurality of pairs of relatively rotatable magnetizable members carried within an inclosing frame and mounted on a single shaft.

One object of our invention is to provide a system of ventilation in which the ventilating medium is caused to pass through and between the several magnetizable members of the motor and over portions of the current-carrying conductors.

A further object of our invention is to provide a novel form of armature coil that is particularly adapted for use in connection with our invention.

In the construction of motors for electric railway locomotives, particularly of the single-phase commutator type, it has been found difficult to design a single-armature motor capable of utilizing the total width available between the locomotive frames and obtain, at the same time, the proper proportioning of the armature winding and commutator cylinder to give good commutating conditions. We propose, therefore, to construct a motor in which the armature is subdivided and provided with a plurality of separate armature windings and commutator cylinders, all of said parts being carried on a single shaft. The stationary magnetizable members and the accompanying field windings are mounted within a single inclosing frame in substantially the manner described in a copending application, Serial No. 76,152, filed February 4, 1916, by R. E. Hellmund and assigned to the Westinghouse Electric & Manufacturing Company. The arrangement and connection of the several windings of the motor forms no part of the present invention which is limited to means for providing proper ventilation of a plural-armature motor of the above described type.

The single figure of the accompanying drawing is a view, partially in section and partially in side elevation, of a plural-armature motor embodying our invention.

The motor comprises a frame 1 which is provided with annular end flanges 2 and 3 and internal annular ribs 4 and 5. Annular magnetizable members 6 and 7 are suitably secured, respectively, between the flange 2 and rib 4 and flange 3 and rib 5. The core members 6 and 7 are composed of plates or laminations which are spaced apart at intervals to form radial ducts 9. The frame 1 is further provided with openings 10 located above the ducts 9 and a substantially central opening 11 located at the top of the space 12 between the ribs 4 and 5.

A shaft 13 is rotatably mounted in bearings (not shown) and carries spiders 14 and 15 which are spaced apart substantially the same distance as the ribs 4 and 5 by an enlarged portion 16 of the shaft and the outer ends of the hubs which are engaged by nuts 17 and 18, respectively. The spiders 14 and 15 respectively comprise radial ribs 19 and 20 upon which are supported annular magnetizable core members 21 and 22. The core members 21 and 22 are composed of sets 23 of plates or laminations that are assembled between end plates 24 and 25. The sets 23 of laminations are spaced apart to form radial passages 26 that register with the passages 9 of the core members 6 and 7. The ribs 19 and 20 of the spiders 14 and 15 are provided with lateral extensions 19$^a$ and 20$^a$ that support commutator cylinders 27 and 28. The extensions 19$^a$ and 20$^a$ are provided with spaced radial openings 29 and 30 adjacent to the commutator cylinders 27 and 28. Armature windings 31 and 32 are carried in suitable slots provided in the core members 21 and 22 and are respectively connected to the bars of commutator cylinders 27 and 28. The coils of the armature windings 31 and 32 have bent-over inner-end portions 33 that project inwardly toward the shaft 13. Substantially L-shaped brackets 34 support the bent-over end portions 33 of the armature coils and also serve to inclose cross-connectors 35. The end-portions 33 and the supporting brackets 34 are so arranged that a space remains between the adjacent faces of the brackets 34. The stationary core members 6 and 7 are provided with suitable exciting and cross-field windings 36 which are more specifically described in the previously mentioned copending application.

Annular end casings 37 and 38 are provided at the respective ends of the motor and are so formed that their inner edges are closely adjacent to the outer edges of the commutator cylinders, air chambers 39 and 40 being thus provided. The casings 37 and 38 are provided with air-inlet pipes 41 and 42 that are connected to, or provided with, a suitable means for creating a circulation of air, such, for example, as blower fans 43. The operation of the fans 43 causes air to be forced into the chambers 39 and 40 and through the spaces between the radial ribs 19 and 20 of the spiders 14 and 15, respectively. An annular baffle plate 44 is mounted midway between the hubs of the spiders 14 and 15 by means of a supporting ring 45 and serves to prevent the air currents which enter the machine from opposite ends from interfering with each other. The rotation of the armature shaft 13 forces the air radially outward through the radial passages 26 and 9 of the core members and the openings 29 and 30 of the extensions 19ª and 20ª to the outside atmosphere, thereby effectively cooling the core members and the surfaces of the commutator cylinders and windings. A portion of the ventilating air will also pass over the outer periphery of the baffle 44 into the central space 12 and out through the opening 11.

From the foregoing, it is apparent that the magnetizable core members and the current-carrying conductors and commutator cylinders carried thereby will be effectively cooled by the passage of air through the radial passages and, furthermore, that the inclosed portions of the current-carrying conductors which are located between the core members will be effectively cooled by the passage of air through the central ducts.

While we have shown our invention in a simple and preferred form and as applied to a particular type of motor, it is not so limited but is capable of general application and is subject to only such limitations as are imposed by the appended claims.

We claim as our invention:

1. The combination with a dynamo-electric machine comprising an inclosing frame, a plurality of pairs of relatively rotatable members located in spaced relation within said frame, the said members being provided with radial passages and spaces below said passages in said rotatable members, of external means for creating a circulation of air, and further means for directing the circulation of air into said spaces from each end of said frame and radially outward through the said passages and into the space between the said members.

2. The combination with a dynamo-electric machine comprising an inclosing frame, a plurality of pairs of relatively rotatable members located in spaced relation within said frame, the said members being provided with radial passages and the rotatable members being provided with openings communicating with said passages, of external means for creating a circulation of air, and further means for directing the circulation of air into said openings and radially outward through said passages and into the space between the said members.

3. The combination with a dynamo-electric machine comprising an inclosing casing, relatively rotatable magnetizable members located within said casing, current-carrying conductors carried by said members and partially located outside of said casing and means for creating a circulation of air within said casing, of means for directing the passage of air radially outward through said members and over the surfaces of the current-carrying conductors that are located outside of said casing.

4. The combination with a dynamo-electric machine comprising an inclosing casing, relatively rotatable magnetizable members located within said casing, a commutator cylinder carried by said rotatable member and located outside of said casing, a winding carried by said stationary member and having its end portions located outside of said casing, and means for creating a circulation of air within said casing, of means for directing the passage of air radially outward through said members and over the surfaces of said commutator cylinder and the end portions of said winding.

5. The combination with a dynamo-electric machine comprising relatively rotatable magnetizable members, windings for said members and a commutator cylinder carried by said rotatable member, of external means for creating a circulation of air, and further means embodying an air chamber extending beneath said commutator cylinder and through said rotatable member and passages in said members and adjacent to said commutator cylinder for causing the passage of air radially outwardly through said members and over the surfaces of said commutator cylinder and said winding.

6. The combination with a dynamo-electric machine comprising an inclosing casing, relatively rotatable magnetizable members located within said casing, windings for said members partially located outside of said casing, and a commutator cylinder carried by said rotatable member and located outside of said casing, of external means for creating a circulation of air, and further means embodying an air chamber extending beneath said commutator cylinder and through said rotatable member and passages in said members, for causing the passage of air radially outwardly through said members and over the surfaces of said commutator cylinder and the portions of said windings located outside of said casing.

7. A dynamo-electric machine comprising an inclosing frame, a plurality of pairs of relatively rotatable magnetizable members located in spaced relation within said frame, armature windings for each of the rotatable members, the said armature windings comprising longitudinally extending coils having their end portions bent laterally within the space between the said members, means for forcing a cooling medium through said space, and commutator cylinders carried by the respective rotatable members at the outer ends thereof and having their segments joined to said windings, respectively.

8. A dynamo-electric machine comprising an inclosing frame, a plurality of pairs of relatively rotatable magnetizable members located in spaced relation within said frame, armature windings for each of the rotatable members, the said armature windings comprising longitudinally extending coils having their end portions bent inwardly within the space between the said members, means for forcing a cooling medium through said space, and commutator cylinders carried by the respective rotatable members at the outer ends thereof, and having their segments joined to said windings, respectively.

In testimony whereof, we have hereunto subscribed our names this 29th day of Jan., 1916.

RUDOLF E. HELLMUND.
RALPH E. FERRIS.

Copies of this patent may be obtained for five cents each, by addressing the "Commissioner of Patents, Washington, D. C."